United States Patent
Sternberg

[15] 3,655,513
[45] Apr. 11, 1972

[54] PURIFICATION OF PROTEASE
[72] Inventor: Moshe Sternberg, South Bend, Ind.
[73] Assignee: Miles Laboratories, Inc., Elkhart, Ind.
[22] Filed: Jan. 25, 1971
[21] Appl. No.: 109,567

Related U.S. Application Data

[63] Continuation-in-part of Ser. No. 785,399, Dec. 19, 1968, abandoned.

[52] U.S. Cl. .................................................195/66 R
[51] Int. Cl. ..................................................C07g 7/02
[58] Field of Search.......................................195/66, 62

[56] References Cited

UNITED STATES PATENTS 3,483,085   12/1969   Sternberg..........................195/66 R Primary Examiner—Lionel M. Shapiro
Attorney—Joseph C. Schwalbach, Louis E. Davidson, Harry T. Stephenson and George R. Caruso

[57] ABSTRACT

Proteases can be isolated and separated from impurities, such as colored bodies, sugars, polysaccharides and minerals, by mixing a protease solution containing impurities with a heteropoly acid to form a precipitate with the protease. The resulting precipitate is then separated from the remaining solution and dried. Useful heteropoly acids are phosphotungstic acid, arsenotungstic acid, silicotungstic acid, borotungstic acid, phosphomolybdic acid, arsenomolybdic acid, silicomolybdic acid, boromolybdic acid, phosphovanadic acid, arsenomolybdic acid, silicovanadic acid, borovanadic acid and mixtures and combinations thereof.

7 Claims, No Drawings

PURIFICATION OF PROTEASE

This application is a continuation-in-part of application Ser. No. 785,399, filed on Dec. 19, 1968, now abandoned.

BACKGROUND AND PRIOR ART

Proteases, such as microbial proteases, are enzymes which are known to be capable of catalyzing the hydrolysis of proteinaceous materials. This property is useful, for example, for tenderizing of meat and for the removal of protein stains on clothes. Proteases have generally been prepared in the prior art by growing a culture of a suitable organism, such as *Bacillus subtilis* in an appropriate nutrient medium, filtering off the bacterial cells, then adding ammonium sulfate or an organic solvent, such as ethanol, to precipitate the protease. The resulting protease precipitate, even after being washed with water or organic solvent, contains significant amounts of colored bodies, sugars, polysaccharides and/or minerals from the fermentation beer in which it was produced. These impurities add undesirable color and odor to the precipitated protease which might render the protease unsuitable for certain end uses, such as inclusion in detergent enzyme compositions. Proteases obtained from animal sources, such as trypsin, and proteases obtained from plant sources, such as bromelain, have similar impurity problems.

DESCRIPTION OF THE INVENTION

In accordance with the present invention, a process is provided for isolating and purifying a protease which comprises mixing a protease solution containing impurities with a heteropoly acid selected from the class consisting of phosphotungstic acid, arsenotungstic acid, silicotungstic acid, borotungstic acid, phosphomolybdic acid, arsenomolybdic acid, silicomolybdic acid, boromolybdic acid, phosphovanadic acid, arsenovanadic acid, silicovanadic acid, borovanadic acid and mixtures and combinations thereof to form a precipitate between the protease and the heteropoly acid, and then separating the resulting precipitate from the remaining impurity-containing solution. The so-purified precipitate can then be conveniently dried. This process has the advantages of isolating a purified protease without losing appreciable amounts of protease activity. It also has the advantages of employing relatively small amounts of heteropoly acids to precipitate the protease as compared to the relatively larger amounts of ammonium sulfate or organic solvent used in prior art methods. It also eliminates costly solvent recovery apparatus required by prior art methods.

The process of the present invention is useful for purifying protease in various forms. It can be in the form of aqueous whole cultures and fermentation beers known in the art. It can also be in the form of impure dried material which is then dissolved in aqueous media for use in the present process. The concentration of protease in the aqueous solution is not critical. As is known in the art, dilute solutions will require large quantities of liquid material to be processed in order to purify a given quantity of protease. The more concentrated solutions will enable a given quantity of protease to be purified with less effort and in a shorter period of time. It is preferred that the starting solution contains about 6 percent (weight/volume basis) total dissolved solids.

The heteropoly acids useful in this invention are phosphotungstic acid, arsenotungstic acid, silicotungstic acid, borotungstic acid, phosphomolybdic acid, arsenomolybdic acid, silicomolybdic acid, boromolybdic acid, phosphovanadic acid, arsenovanadic acid, silicovanadic acid, borovanadic acid, mixtures of two or more of these acids, and combinations of two or more of these acids, such as, silicotungsticvanadic acid, phosphomolybdictungstic acid, arsenoboromolybdictungsticvanadic acid, and the like. These heteropoly acids are well known materials and are prepared by well known methods. These heteropoly acids are all soluble in water.

In the practice of this invention an aqueous solution of protease is mixed with the heteropoly acid or a solution of the heteropoly acid. The heteropoly acid is employed in an amount such that the resulting mixture contains from about 0.05 percent to about 1 percent (weight/volume basis) heteropoly acid. It is preferred to use the heteropoly acid in an amount such that the resulting mixture contains about 0.5 percent (weight/volume basis) heteropoly acid. The pH of the protease solution should be in the range of from about 4.0 to about 5.5 when it is mixed with the heteropoly acid. The pH is preferably from about 4.5 to about 5.0. When the pH is below about 4.0, the protease will lose substantially all its enzyme activity. When the pH is above about 5.5, little or no precipitate will form with the heteropoly acid. The mixing temperature and mixing time between the heteropoly acid and the protease-containing solution are not narrowly critical. A mixing temperature of about 22–30° C. and a mixing time of about 5 minutes are suitable.

The above-prepared precipitate can be separated by filtration, centrifugation or other convenient means from the remaining impurity-containing solution.

In order to maximize the recovery of protease activity according to the process of the present invention, it is preferred to have a molar concentration of from about 0.001 to about 0.1 of $Ca^{++}$ or $Zn^{++}$ salts in the protease solution at the time the heteropoly acid is added. Any water-soluble calcium or zinc salts, such as calcium chloride, calcium acetate, zinc sulfate and the like can be employed to achieve the above concentrations.

In the event that the protease isolated and purified in accordance with the present invention is to be employed in treatment of human or animal foods, it is desirable to remove any traces of free heteropoly acids. This can be accomplished by dissolving the protease-containing product at a pH above about 6.0 and removing the heteropoly acid by suitable means, such as by the use of ultra-filtration, dialysis, ion exchange or gel filtration techniques. The presence of calcium salts, such as calcium acetate, calcium chloride, calcium gluconate and the like, or barium salts, such as barium acetate, barium chloride or the like, improves the removal of the heteropoly acids. At pH values above about 6.0 these materials can form a solid complex with the free heteropoly acids or with the individual acid components of the heteropoly acids.

The process of the present invention isolates and purifies protease with minimum loss of protease activity. Two methods have been employed to determine protease activity of the starting material and of the purified recovered product. These methods which are generally known to those skilled in the art are described below:

PROTEASE ASSAY METHOD 1

A casein substrate solution was prepared by mixing 1.875 g. (anhydrous basis) casein, 25 ml. of a 0.3 molar aqueous solution of tris(hydroxymethyl) aminomethane adjusted to pH 9.2 with hydrochloric acid, and 175 –200 ml. distilled water and them heating the resulting mixture at 55° C. for at least 45 min. The pH was adjusted to 9.2 at 55° C., the solution was cooled to 25° C. and diluted to 250 ml. A 4.0 ml. aliquot portion of the above casein substrate was pipetted into each of six 25 × 150 mm. test tubes A 1.0 ml. portion of distilled water was added to two of the test tubes for use as substrate blanks. Two of the test tubes containing casein substrate were used for assay of alkaline protease. To each of these test tubes was added 1.0 ml. of 10 millimolar aqueous solution of disodium ethylene diamine tetraacetate dihydrate. The remaining two test tubes were used for assay of total protease. To each of these test tubes was added 1.0 ml. of 6.0 millimolar aqueous solution of calcium chloride. The test tubes were all then loosely stoppered and heated in a 55° C. water bath.

The enzyme samples employed in the assay were diluted to a concentration such that they contained from about 0.2 to about 0.6 enzyme units, as defined hereinafter, per milliliter of the diluted enzyme solution. Solid enzyme material was placed in solution form by trituration with 2.0 ml. of 0.3 molar aqueous solution of tris(hydroxymethyl) aminomethane at pH 9.2 and then appropriately diluted.

At a chosen time, 1.0 ml. distilled water was added to each of the substrate blank tubes and 1.0 ml. diluted enzyme solution to each of the enzyme assay tubes. The contents of each tube were then mixed by swirling. After 15 min., 5.0 ml. of a 1.8 percent (weight/volume basis) aqueous solution of trichloroacetic acid were added to each tube and mixed. This solution was prepared by mixing 4.5 g. trichloroacetic acid, 25 ml. of a 2.2 molar aqueous solution of sodium acetate, 25 ml. of a 5.22 molar aqueous solution of acetic acid, 1 ml. of 5 volume percent aqueous solution of polyoxyethylene (20) sorbitan monooleate (Polysorbate80) and sufficient water to form a total solution volume of 250 ml. All the test tubes were heated at 55° C. for 30 min. after adding the above reagent solution and then cooled to room temperature. The test tubes containing the enzyme assay materials were then centrifuged and the resulting solids discarded. The supernatant liquid contained the casein hydrolyzate reaction products.

To each of two 15 × 150 mm. test tubes was added 0.5 ml. distilled water to be used as a reagent blank. To each of two similar test tubes was added 0.5 ml. of a 1.0 micromolar aqueous leucine solution prepared by mixing 131.2 mg. leucine (free base form) and 5 ml. of 2 molar sodium acetate buffer at pH 4.0 and diluting to 100 ml. and then diluting 1 ml. of this stock solution with distilled water to 10 ml. The latter two tubes contained at leucine standard solution. To each of two similar test tubes were added 0.5 ml. of the above prepared casein hydrolysis reaction products. To each of the above six test tubes 1.0 ml. of a cyanide buffer solution and 1.0 ml. of a 2 percent (weight/volume basis) aqueous solution of 1,2,3-indantrione hydrate (Ninhydrin) were added and mixed thoroughly. The cyanide buffer solution was prepared by mixing 10 ml. of a 0.01 molar aqueous solution of potassium cyanide and 1.0 liter of a 3.8 molar aqueous solution of sodium acetate buffer at pH 5.25. All the test tubes were then heated in a boiling water bath for 20 min. The test tubes were then removed from the water bath, and 10 ml. of 50 volume percent aqueous solution of isopropanol were then blown into each, after which said tubes were shaken and cooled to room temperature. At room temperature each test tube was shaken, and the absorbance of the contents versus the absorbance of distilled water was measured with a light source having a wavelength of 570 millimicrons. The absorbance was measured for the substrate blanks, the reagent blanks, the leucine standard and the enzyme reaction solutions. The average absorbance value for the two tubes for each of the above items was computed. The absorbance values for the enzyme assays for total protease and for alkaline protease were computed separately. The enzyme activity was computed by the use of the following formula wherein a unit of activity is defined as the amount of enzyme that will hydrolyze peptide bonds to give free amino groups equivalent to 1 micromole of leucine per minute:

$$\text{Activity units} = \frac{A_1 \times 0.773}{A_2 \times \text{dilution of sample}}$$

wherein:

$A_1$ = Absorbance of enzyme reaction − absorbance of substrate blank $A_2$ = Absorbance of leucine standard − absorbance of reagent blank.

PROTEASE ASSAY METHOD 2

A casein substrate solution was prepared by mixing 1.5 g. (anhydrous basis) casein, 25 ml. of a 0.3 molar aqueous solution of tris(hydroxymethyl) aminomethane adjusted to pH 9.2 with hydrochloric and 200 ml. of water having hardness equivalent to 269 ppm (parts per million) calcium carbonate. The above aqueous solution of tris(hydroxymethyl) aminomethane was also prepared using water having the above hardness. This mixture was then heated to 55° C. in a water bath with intermittent stirring for 45 min. The mixture was then cooled to room temperature and the pH was adjusted to 9.2. The resulting solution was then transferred to a 250 ml. volumetric flask and brought to volume by addition of water having the above hardness. A 5.0 ml. aliquot portion of the above casein substrate was added to each of two 25 × 150 mm. test tubes. The tubes were then placed in a 55° C. water bath for 15 min. To one of the test tubes representing the blank were added 5 ml. of an aqueous trichloroacetic acid solution. This solution was prepared by mixing 100 ml. trichloroacetic acid, 100 ml. 2.2 molar aqueous sodium acetate solution, 100 ml. 5.22 molar aqueous acetic acid solution, and 4 ml. of 5 volume percent aqueous solution of polyoxyethylene (20) sorbitan monooleate (Polysorbate 80) in a 1 liter volumetric flask and diluting to volume with distilled water. An enzyme sample to be assayed was then diluted with a 2 percent (weight/volume basis) aqueous sodium polyphosphate solution so that the optical density of the diluted sample is 0.2 – 0.5 when measured with a light source having a wavelength of 275 millimicrons. The above polyphosphate solution was prepared by adding to 4,850 ml. distilled water in the following order with constant stirring: 100 g. sodium tripolyphosphate, 50 ml. of a 2.52 percent (weight/volume basis) aqueous calcium chloride solution, 50 ml. of a 1.4 percent (weight/volume basis) aqueous magnesium chloride solution and 50 ml. of a 2.1 percent (weight/volume basis) aqueous sodium bicarbonate solution. The resulting solution had a hardness equivalent to 269 ppm calcium carbonate. Stirring was continued until all solids were dissolved. THe pH was adjusted to 9.2 with sodium hydroxide. A 1 ml. portion of the above diluted enzyme sample was added to each of the above test tubes and the resulting mixtures were heated at 60° C. for exactly 15 min. A 5 ml. portion of the above-described trichloroacetic acid solution was then blown into the enzyme assay tube and mixed gently. Both test tubes were then maintained at 60° C. in the water bath for 30 min. After the above addition of trichloroacetic acid. Both tubes were then centrifuged and the supernatant liquid in each was carefully decanted into a clean cuvette. The optical density of the assay sample and of the blank were then measured at 275 millimicrons wavelength against distilled water. The enzyme potency was then calculated by the use of the following equation wherein the activity unit is the amount of enzyme that will produce a 0.0146 increase in optical density per min. under the conditions of the assay:

$$\text{Activity units} = \frac{(\text{optical density difference})(50)}{(\text{dilution of sample})}$$

wherein:

Optical density difference = Optical density of sample−optical density of blank

The invention will be further described in the following illustrative examples.

EXAMPLE 1

An aqueous protease solution containing a mixture of neutral and alkaline proteases was obtained by fermenting in a well known manner an aqueous nutrient medium with a microbial strain of Bacillus subtilis and then filtering off the bacterial cells. The resulting filtrate was then concentrated by evaporation to a solids level of 6 percent (weight/volume basis). An 80 ml. portion of the concentrated filtrate having an activity of 257 units/ml. total protease and 106 units/ml. alkaline protease was adjusted to pH 4.5 using dilute hydrochloric acid. To this was then added phosphotungstic acid to form a concentration in the resulting mixture of 0.5 percent (weight/volume basis). The reaction mixture was then agitated and allowed to stand for 5 min. at room temperature (30° C.), during which time a precipitate formed. The resultant mixture was then centrifuged to separate the precipitate from the remaining solution which was discarded. The precipitate was suspended in 80 ml. of 1 percent (weight/volume basis) aqueous calcium acetate solution. The resulting liquid protease contained 147 units/ml. total protease and 80 units/ml. alkaline protease. This represents a recovery of 57.2 percent of the total proteolytic activity and 75.5 percent of the alkaline protease activity. The activities of the starting material and isolated product were assayed by the above Protease Assay Method 1. The isolated purified product was free of undesirable color, odor and other impurities from the original fermentation beer. This isolated and purified protease was then employed in a well known manner to digest protein-containing materials.

EXAMPLE 2

A 40 ml. portion of a *Bacillus subtilis* filtrate obtained in the manner described in Example 1 having a total protease activity of 255 units/ml. was adjusted to pH 4.5 with dilute hydrochloric acid and treated with 0.5 percent (weight/volume basis) of phosphomolybdic acid. The resulting mixture was treated as described in Example 1 to produce an isolated precipitate having a total acitivty of 3,930 units. This represents a recovery of 38.6 percent of the total proteolytic activity. The activities of the starting material and the isolated product were obtained by the Protease Assay Method 1.

EXAMPLE 3

A *Bacillus subtilis* filtrate obtained in the manner described in Example 1 having a total protease activity of 229 units/ml. and alkaline protease activity of 95.3 units/ml. was adjusted to pH 4.8 and 0.4 percent (weight/volume basis) phosphotungstic acid was added. The resulting mixture was treated as described in Example 1 to produce an isolated precipitate having a total protease activity of 40.6 units/ml. and alkaline protease activity of 36.6 units/ml. This represents a recovery of 17.7 percent total protease and 38.4 percent alkaline protease. Four portions of a similar *Bacillus subtilis* filtrate were then selected each having a total protease activity of 136 – 136.5 units/ml. and an alkaline protease activity of 79.3 units/ml. These portions were then separately mixed with calcium chloride or zinc sulfate to result in various concentrations of the salt additives. The resulting solutions were then adjusted to pH 4.8 to 0.4 percent (weight/volume basis) phosphotungstic acid was added to each. The resulting mixtures were treated as described in Example 1 to produce isolated precipitates which were then assayed. The results are shown below:

ing precipitate was recovered by centrifugation, mixed with 300 grams of calcium acetate and spray dried. A 2.07 kilograms quantity of dry product was obtained having a total protease activity of 1,205,000 units/gram. This represented a recovery of 64.7 percent. The protease activities of the starting material and the isolated product were obtained by Protease Assay Method 2.

EXAMPLE 5

The procedure of Example 4 was repeated up to the recovery of the centrifuged precipitate. This precipitate was then washed with 2.5 volumes of ethyl alcohol in the presence of suspended 300 grams of calcium gluconate. The resulting mixture was filtered on a filter press and dried in vacuum at 40° C. The resulting 1.58 kilograms of dried product had total protease activity of 1,300,000 units/gram. This represented a recovery of 53.3 percent. Protease Assay Method 2 was employed.

EXAMPLE 6

A fermentation filtrate of *Bacillus subtilis* containing protease was obtained as described in Example 1. To a 40 ml. portion of this filtrate having total protease activity of 11,450 units/ml. was added calcium chloride in sufficient amount to provide a calcium concentration of 0.02 molar. The pH was adjusted to 4.75, and 0.3 percent (weight/volume basis) borotungstic acid was added. After treatment according to Example 1, the resulting precipitate was separated by centrifugation. It had a total protease activity of 202,000 units. This represented a recovery of 44.1 percent. Protease Assay Method 2 was employed in this example.

EXAMPLE 7

An impure aqueous solution of trypsin was prepared by dissolving 9 grams of a mixture of trypsin with other pancreatic materials in 300 ml. water. The pH of the solution was adjusted to 7.4 by the addition of 0.1 N sodium hydroxide. The solution was separated from the resulting undissolved solids and mixed with an equal volume of 0.2 molar sodium acetate buffer at pH 4.75. The final pH of the resulting mixture was 4.85. A 5 weight percent aqueous solution of phosphotungstic acid was added to produce a concentration of 0.075 percent

| Added salt molar concentration | | Total protease activity | | | Alkaline protease activity | | |
|---|---|---|---|---|---|---|---|
| $Ca^{++}$ | $Zn^{++}$ | Initial, u./ml. | Final, u./ml. | Recovery percent | Initial, u./ml. | Final, u./ml. | Recovery percent |
| 0.1 | | 136 | 102.0 | 75 | 79.3 | 68.2 | 86 |
| 0.001 | | 136 | 96.7 | 71.1 | 79.3 | 53.8 | 68 |
| | 0.1 | 136.5 | 87.5 | 64.1 | 79.3 | 54.5 | 68.7 |
| | 0.001 | 136.5 | 94.7 | 69.4 | 79.3 | 61.0 | 77 |

The activities of the starting materials and isolated products were assayed by the Protease Assay Method 1. The above data clearly show that the presence of calcium or zinc salts in the protease-containing solution at the time the heteropoly acid is added increases the overall recoveries of total protease and alkaline protease.

EXAMPLE 4

A fermentation broth filtrate of *Bacillus subtilis* containing protease was obtained as described in Example 1. To a 265 liters portion of this filtrate having a total protease activity of 14,550 units/ml. was added calcium chloride to form a calcium concentration of 0.02 molar $Ca^{++}$. The pH was then adjusted to 4.75 using hydrochloric acid. To the resulting solution were added 13.2 liters of a 10 percent (weight/volume basis) aqueous solution of phosphotungstic acid. This resulted in a concentration of 0.47 percent (weight/volume basis) phosphotungstic acid in the protease solution. This mixture was then agitated for 5 min. at room temperature. The result- (weight/volume basis) in the overall mixture. This mixture was agitated for 5 min. at room temperature. The resulting precipitate was recovered by centrifugation and redissolved in 120 ml. of water by maintaining a pH of 7.4 with 0.1 N sodium hydroxide. The solution was then lyophilized to a dry powder. This powder product contained 35 percent of the initial trypsin activity and it was over twice as concentrated as the original material indicating significant purification. Protease Assay Method 2 was employed.

EXAMPLE 8

A 1 weight percent bromelain solution adjusted to pH 4.55 with 0.05 molar acetate buffer was mixed with a 10 weight percent aqueous solution of phosphotungstic acid to produce a final concentration of 0.2 percent (weight/volume basis) of the heteropoly acid in the overall mixture. This mixture was agitated for 5 min. at room temperature. The resulting precipitate was recovered by centrifugation and redissolved in water at pH 7.7. The initial solution contained 16.3 protease units per mg. dissolved solids while the final solution contained 54.5 protease units per mg. dissolved solids indicating a significant purification of the bromelain. Protease Assay Method 2 was employed.

What is claimed is:

1. A process for isolating and purifying a protease which comprises mixing a protease solution containing impurities and having a pH from about 4.0 to about 5.5 with a heteropoly acid selected from the class consisting of phosphotungstic acid, arsenotungstic acid, silicotungstic acid, borotungstic acid, phosphomolybdic acid, arsenomolybdic acid, silicomolybdic acid, boromolybdic acid, phosphovanadic acid, arsenovanadic acid, silicovanadic acid, borovanadic acid and mixtures and combinations thereof to form a precipitate between the protease and the heteropoly acid, and then separating the resulting precipitate from the remaining impurity-containing solution.

2. A process according to claim 1 wherein the concentration of the heteropoly acid in the protease solution is from about 0.05 percent to about 1 percent (weight/volume basis).

3. A process according to claim 1 wherein the concentration of the heteropoly acid in the protease solution is about 0.5 percent (weight/volume basis) and the pH of the protease solution from about 4.5 to about 5.0.

4. A process according to claim 1 wherein the heteropoly acid is phosphotungstic acid.

5. A process according to claim 1 wherein the heteropoly acid is phosphomolybdic acid.

6. A process according to claim 1 wherein the heteropoly acid is borotungstic acid.

7. A process according to claim 1 wherein the protease solution contains calcium or zinc salts in a molar concentration of from about 0.001 to about 0.1 at the time the heteropoly acid is added.

* * * * *